United States Patent Office 2,949,490
Patented Aug. 16, 1960

2,949,490

PROCESS FOR THE PREPARATION OF ORGANIC NITROSO COMPOUNDS

Josef Heinrich Fritz Pieper, Berlin-Lichterfelde, and Johanna Elisabeth Viktoria Natalie Stauch, Berlin-Schlachtensee, Germany, assignors, by mesne assignments, to Hercules Powder Company, Wilmington, Del., a corporation of Delaware No Drawing. Filed Mar. 18, 1958, Ser. No. 722,142

Claims priority, application Germany May 13, 1954

6 Claims. (Cl. 260—647)

This invention relates to the preparation of organic nitroso compounds and, more particularly, to the preparation of a very pure form of nitrosocyclohexane.

It is known in the art that primary amines, the amino group of which is connected with a tertiary carbon atom, may be converted in stages into corresponding oxidation products, for example, hydroxylamine, nitroso and nitro compounds. Also, it is known that the nature of this oxidation is independent of the aliphatic, aromatic or alicyclic character of the amine used.

However, in the case of primary amines, where the amino group is connected with a primary or secondary carbon atom, the oxidation proceeds in a fundamentally different manner. That is, on oxidizing the hydroxylamine compounds obtained in the first stage of oxidation of such primary amines, oximes are obtained instead of nitroso compounds. In the further course of oxidation, these oximes are converted into hydroxamic or nitronic acid. The stable end products of this oxidation are the nitro compounds.

According to the present invention, hydroxylamine compounds, the characteristic NHOH group of which is linked to a primary or secondary carbon atom, are oxidized to the corresponding nitroso compounds in organic solvents, particularly in hydrocarbons or their chlorinated substitution products with the use of molecular oxygen or air in the presence of certain specific catalysts. In connection with this, it is important that the hydroxylamine compound to be oxidized is substantially free of contamination with other amines; otherwise, the oxidation proceeds to the oxime because of the alkalinity of the reaction solution.

More particularly, it has now been discovered that cyclohexylhydroxylamine can be converted into a very pure form of nitrosocyclohexane by oxidizing cyclohexylhydroxylamine free of contamination with other amines, such as, for example, cyclohexylamine, in an inert organic solvent medium at a pH not greater than 5.5 with air in the presence of a catalyst of the group consisting of salts of iron, cobalt, nickel and manganese which are soluble in the inert solvent medium of the reaction mixture, the naphthenic acid salts of the aforestated metals being especially suitable.

Very pure cyclohexylhydroxylamine which contains no cyclohexylamine must be used in accordance with this invention in order to obtain a pure form of nitrosocyclohexane uncontaminated with cyclohexanone oxime. If, on the other hand, the cyclohexylhydroxylamine is contaminated with cyclohexylamine, then a mixture of cyclohexanone oxime and nitrosocyclohexane is obtained, since the reaction mixture at the beginning of the reaction will have an alkaline reaction, due to the cyclohexylamine impurity. It is only later on in the reaction, i.e., after the cyclohexylamine impurity has been oxidized and the reaction mixture turns acid, that the cyclohexylhydroxylamine is then converted to nitrosocyclohexane.

The molecular oxygen or air employed as oxidizing agent is passed in a finely divided, carbon dioxide free state through the reaction mixture containing the hydroxylamine compound and catalyst.

The organic solvent media of this invention functions as an inert reaction medium for the oxidation reaction of this invention. Accordingly, any organic solvent medium which is normally liquid at ordinary atmospheric pressures and ambient temperatures, which is not oxidized by molecular oxygen or air in the presence of salts of iron, cobalt, nickel or manganese which are soluble therein, and which do not react with the reactant hydroxylamine compound or the resultant nitrosocyclohexane product, is suitable for the purposes of this invention, and anyone skilled in the art will recognize numerous inert organic solvents suitable for the purposes of this invention. Typical suitable inert organic solvents include, by way of example, but not by way of limitation, various aliphatic, aromatic and cycloaliphatic hydrocarbons and their chlorinated substitution products, such as various volatile petroleum distillate fractions, benzene, toluene, cyclohexane, methylene chloride, ethylene dichloride, chloroform, carbon tetrachloride, and the like.

The rates of oxidation of hydroxylamine compounds to nitroso compounds with the use of molecular oxygen as oxidizing agent in the presence of catalyst vary. In general, the reaction time amounts to about 1 to 3 hours. The reaction time may be substantially reduced by heating the reaction solution to a temperature of about 40°–45° C. The use of higher temperatures is undesirable, because of the possibility of secondary reactions.

Upon completion of the reaction, the solvent is evaporated under vacuum and the product is separated from the catalyst by dissolving in a small amount of solvent such as methanol and then precipitating the product with water for purification, or the product may be purified by one or more recrystallizations from solvent, if desired.

The following examples will serve to illustrate this invention. All parts are by weight and all temperatures are centigrade throughout the specification unless otherwise designated.

*Example 1*

One part cyclohexylhydroxylamine is slurried in a solution of 0.05 part cobalt naphthenate and 10–15 parts chloroform. Air oxygen is passed, at a temperature of 40–45°, through the slurry in a gas scrubbing flask equipped with fused glass frit and reflux condenser. The reaction produces a clear solution, the color of which changes from violet to green. After 1 hour the reaction is complete. The chloroform is evaporated under vacuum. The residue, which is colored blue by the catalyst, melts at 100°.

The reaction product is dissolved in a little methanol and precipitated with water for purification. A white, crystalline nitrosocyclohexane precipitates and, to obtain a product of pure melting point, the process is repeated once or twice. There is obtained ca. 80% nitrosocyclohexane melting at 117°.

*Example 2*

One part cyclohexylhydroxylamine is slurried in a solution of 0.05 part manganese naphthenate and 10–15 parts benzene. The reaction is conducted similarly to Example 1. There is again obtained a clear solution, the color of which turns from brown to yellow. The reaction is complete after 3 hours. The residue remaining after evaporation of the benzene is colored brown by the catalyst and has a melting point of 100°. It is purified as described under Example 1.

Eighty percent nitrosocyclohexane, referred to the amount of cyclohexylhydroxylamine used, is obtained. Its melting point, 117°.

The very pure form of nitroso compounds obtained in accordance with this invention may be used in industrial processes where, for example, bis-nitrosocyclohexane is rearranged to cyclohexanone oxime of high degree of purity.

This application is a continuation-in-part of our copending application, Serial No. 501,446, filed April 14, 1955, now abandoned.

What we claim and desire to protect by Letters Patent is:

1. In a method for the production of nitrosocyclohexane by oxidation of cyclohexylhydroxylamine, the improvement which comprises oxidizing cyclohexylhydroxylamine free of contamination with other amines with an oxidizing agent of the group consisting of molecular oxygen and air in an inert organic solvent medium of the group consisting of aliphatic, aromatic, and cycloaliphatic hydrocarbons and chlorinated substitution products thereof at a pH not greater than 5.5 in the presence of a catalyst of the group consisting of the naphthenic acid salts of iron, cobalt, nickel and manganese which are soluble in said inert organic solvent medium.

2. In a method for the production of nitrosocyclohexane by oxidation of cyclohexylhydroxylamine, the improvement which comprises oxidizing cyclohexylhydroxylamine free of contamination with cyclohexylamine with air in an inert organic solvent medium of the group consisting of aliphatic, aromatic, and cycloaliphatic hydrocarbons and chlorinated substitution products thereof at a pH not greater than 5.5 in the presence of a catalyst of the group consisting of the naphthenic acid salts of iron, cobalt, nickel and manganese which are soluble in said inert organic solvent medium.

3. The process in accordance with claim 2 in which the inert organic solvent medium is a hydrocarbon.

4. The process in accordance with claim 2 in which the inert organic solvent medium is a chlorinated hydrocarbon.

5. The process in accordance with claim 2 in which the catalyst is cobalt naphthenate.

6. The process in accordance with claim 2 in which the catalyst is manganese naphthenate.

References Cited in the file of this patent

Okamura et al.: Chem. Abs., 47, 2292de (1953).
Okamura et al.: Chem. Ab., 48, 4225cd (1954).
Okamura et al.: Chem. Abs., 48, 9933c (1954).
Sakurai: Chem. Abs., 48, 716i (1954).
Sakurai: Chem. Abs., 48, 9070i (1954).
Richter: Org. Chem., vol. I, pages 195 and 204 (1944), distributed by Nardenan Publ. Co., Inc., N.Y., 3rd ed.